US012669376B2

(12) United States Patent
Ilchenko et al.

(10) Patent No.: US 12,669,376 B2
(45) Date of Patent: Jun. 30, 2026

(54) APPARATUS AND A METHOD FOR CARRYING OUT SPECTROSCOPY

(71) Applicant: Lightnovo ApS, Birkerød (DK)

(72) Inventors: Oleksii Ilchenko, Birkerød (DK); Yurii Pilhun, Birkerød (DK); Andrii Kutsyk, Holte (DK)

(73) Assignee: LIGHTNOVO APS, Birkerød (DK)

( * ) Notice: Subject to any disclaimer, the term of this patent is extended or adjusted under 35 U.S.C. 154(b) by 146 days.

(21) Appl. No.: 18/804,595

(22) Filed: Aug. 14, 2024

(65) Prior Publication Data

US 2026/0049868 A1      Feb. 19, 2026

(51) Int. Cl.
| | |
|---|---|
| *G01J 3/44* | (2006.01) |
| *G01J 3/18* | (2006.01) |
| *G01N 21/65* | (2006.01) |
| *G01J 3/28* | (2006.01) |

(52) U.S. Cl.
CPC ............... *G01J 3/44* (2013.01); *G01J 3/1895* (2013.01); *G01N 21/65* (2013.01); *G01J 2003/284* (2013.01); *G01J 2003/2866* (2013.01); *G01N 2201/0612* (2013.01); *G01N 2201/0635* (2013.01)

(58) Field of Classification Search
CPC ...... G01J 3/44; G01J 3/1895; G01J 2003/284; G01J 2003/2866; G01N 21/65; G01N 2201/0612; G01N 2201/0635
See application file for complete search history.

(56) References Cited

U.S. PATENT DOCUMENTS

| | | | |
|---|---|---|---|
| 5,455,673 A | 10/1995 | Alsmeyer et al. | |
| 5,850,623 A | 12/1998 | Carman, Jr. et al. | |
| 2003/0030800 A1 | 2/2003 | Golden et al. | |
| 2010/0305873 A1 | 12/2010 | Sjoden et al. | |
| 2019/0195688 A1 | 6/2019 | Atabaki et al. | |
| 2021/0072158 A1* | 3/2021 | Ilchenko | G01J 3/0224 |

\* cited by examiner

*Primary Examiner* — Jamil Ahmed
(74) *Attorney, Agent, or Firm* — Crowell & Moring LLP

(57)      ABSTRACT

An apparatus obtains a first spectrum beam from an interaction between a first portion of a laser beam and a sample and a second spectrum beam from an interaction between a second portion of the laser beam and a reference sample. A diffraction element splits the first spectrum beam into a first spectrum associated with the sample and splits the second spectrum beam into a second spectrum associated with the reference sample. A detector with pixels for detecting the first and second spectrum. A data acquisition device carries out a measurement, wherein first data indicative of the first spectrum is detected and second data indicative of the second spectrum is detected, wherein the first data is collected in different pixels than the second data. The data acquisition device:

a) determines a point spread function PSF using a convolution function; and b) determines a real spectrum of the sample using the PSF.

20 Claims, 9 Drawing Sheets

Grating

L7

Sensor

Laser 1

F4

L6

L1

F1

M1

D1

F2

F3

P1

L3

L2

M2

Laser 2

L4

L5

Sample of interest
S$_{data}$

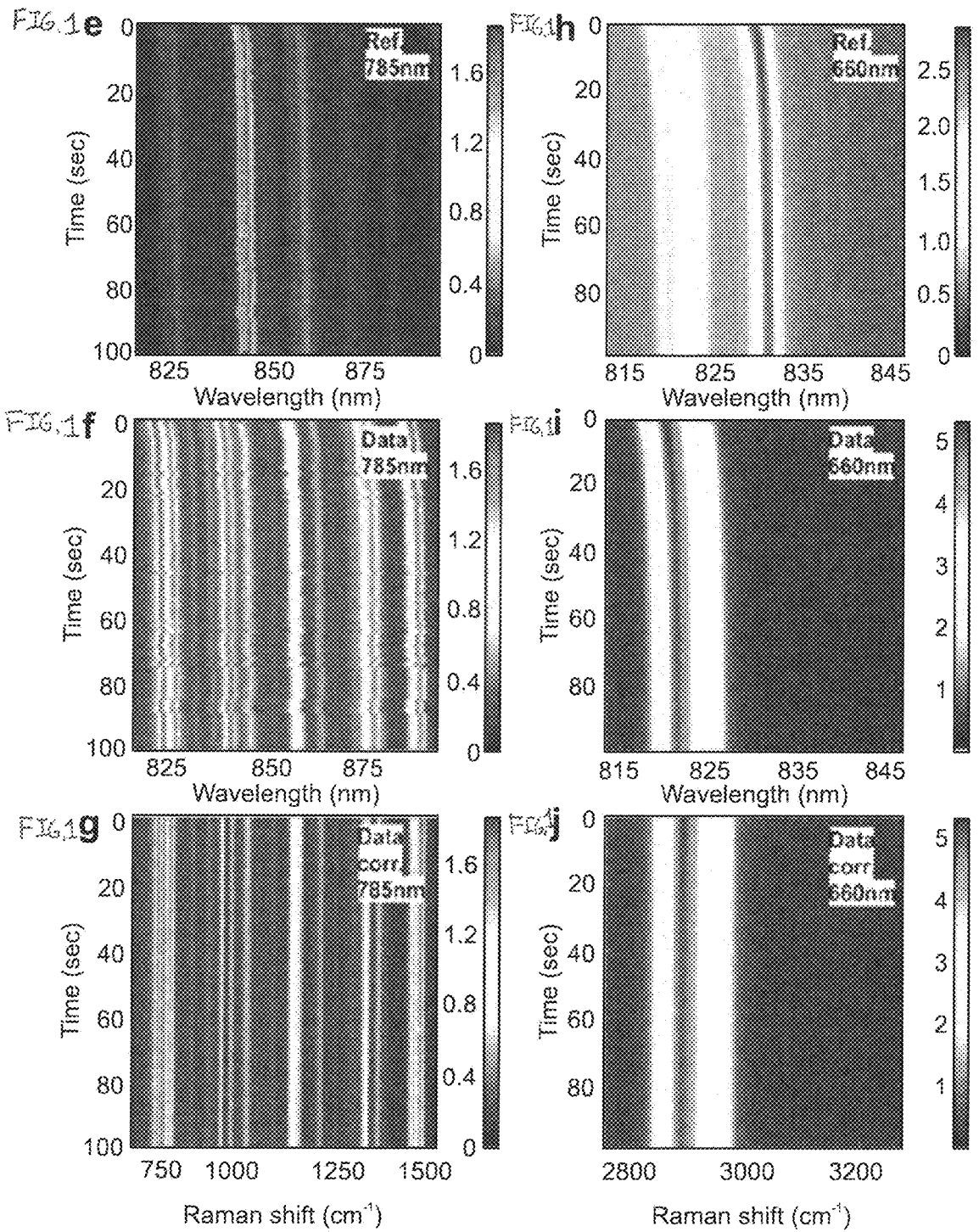

APPARATUS AND A METHOD FOR CARRYING OUT SPECTROSCOPY

BACKGROUND OF THE INVENTION

Field of the Invention

The present disclosure relates to an apparatus and a method for carrying out spectroscopy.

Related Art

Spectroscopy is a useful tool to examine a sample. Spectroscopy, such as Raman spectroscopy, is also very useful to identify a sample based on a sample's spectral fingerprint or to determine a chemical composition of the sample based on the components' spectral fingerprints. The discovery of the Raman effect in 1928 has aided to the fundamental understanding of the quantum nature of light and matter interaction, and has also opened up completely novel areas of optics and spectroscopic research that has accelerated greatly during the last decade. The utility of Raman spectroscopy has been demonstrated for a diverse range of biological, biomedical and chemical applications, such as chemical imaging of living cells and tissues, stem cell and cancer research, bacterial identification, chemical hazards and illicit substances detection, as well as food and product authentication, and with a great deal of interest and research into its potential for disease diagnosis in the laboratory and in-vivo.

Raman spectroscopy has been developed into a variety of methods and experimental realizations, such as confocal Raman microscopy, Raman endoscopy, spatially offset Raman spectroscopy (SORS), resonance Raman spectroscopy, and surface enhanced Raman spectroscopy (SERS). The listed Raman spectroscopy and microscopy methods are non-destructive, label-free, non-invasive, and capable of providing 3D molecular sensing with depth profiling. Such capabilities, however, come at the cost of extremely high requirements for instrumentation, such as the used laser should have stable wavelength and stable high optical power, and the spectroscopic sensor should have low noise. Therefore, Raman spectroscopy and microscopy applications that require high spectral resolution and sensitivity would normally need to be performed on high-end, bulky, and costly Raman instruments. The need for miniaturization of Raman instrumentation is driven by applications where the complexity and/or the bulkiness of existing devices is obstructive. Application examples in need of miniaturization include space exploration, on-site toxic substance inspection, in-vivo diagnostics of tissues, chemical identification in hardly accessible places using robots and drones, and Raman device integration into robotic arms for biomedical applications.

Systems and methods for carrying out Raman spectroscopy are described in US2021072158 A1, and entire contents of which are incorporated herein by reference.

It is an object of the present disclosure to provide an improved apparatus and method for carrying out spectroscopy, in particular Raman spectroscopy.

SUMMARY

In one aspect, the present disclosure relates to an apparatus for carrying out spectroscopy, in particular Raman spectroscopy, on a sample, the apparatus being configured to obtain a first spectrum beam from an interaction between a first portion of a laser beam and a sample and a second spectrum beam from an interaction between a second portion of the laser beam and a reference sample, the apparatus includes an optical system which is configured to guide the first spectrum beam and the second spectrum beam to a diffraction element, such as a grating, the diffraction element being configured to split the first spectrum beam into a first spectrum of spatially separated wavelength components associated with the sample and to split the second spectrum beam into a second spectrum of spatially separated wavelength components associated with the reference sample, the apparatus including a detector with an array of pixels for detecting the first and second spectrum, the apparatus including a data acquisition device which is configured:

to carry out at least one measurement using the detector, wherein, simultaneously, first data which is indicative of the first spectrum of spatially separated wavelength components is detected over time by the array of pixels and second data which is indicative of the second spectrum of spatially separated wavelength components is detected over time by the array of pixels, wherein the first data is collected in different pixels than the second data, the data acquisition device being further configured to carry out the following steps:

a) determining a point spread function PSF from the second data related to a measured spectrum of the reference sample and a predetermined known spectrum of the reference sample, wherein the PSF function is determined using a convolution function that provides a predetermined relationship between the PSF, a measured spectrum in the second data and the ideal spectrum of the reference sample;

b) determining a real spectrum of the sample using or based on the determined PSF and the first data related to the measured spectrum of the sample.

The term "real spectrum of the sample", which is determined by use of the PSF and the first data which is associated with the measured spectrum of the sample is herein also called "ideal spectrum", as it is obtained from further processing the measured first data and thereby a more exact and at least close to ideal or real spectrum of the sample can be obtained.

In some embodiments, the known spectrum of the reference sample can be a spectrum obtained from a library or a database and it may be stored on a storage of the data acquisition device. In some embodiments, the known spectrum of the reference sample may be obtained from an actually measured spectrum of the reference sample on the particular apparatus. The known spectrum may be provided in form of data on the storage of the data acquisition device which was obtained from such a measured spectrum. Therefore, in some embodiments, the data acquisition device may compare a "library spectrum" provided in digital form on the storage of the data acquisition device, but which was obtained from a measurement on the same device. This may have benefits of taking into account parameters and possible artefacts of the specific apparatus.

In some embodiments, the determining of the real spectrum of the sample, by the data acquisition device, includes using the determined PSF and the first data related to the measured spectrum of the sample in a deconvolution function, which is the inverse of the convolution function.

In some embodiments, the data acquisition device is configured to detect a predefined event, when the event occurs during the measurement, wherein the data acquisition device is configured to carry out steps a) and b) in response to the detection of the predefined event. In some embodiments, the predefined event is causing a movement or a change in position of the first spectrum or the second spectrum on the array of pixels during a measurement. In some embodiments, the predefined event is a mode hop of a laser used to provide the laser beam.

In another aspect, the present invention relates to a method for carrying out spectroscopy, in particular Raman spectroscopy, on a sample, wherein the method uses an apparatus which is configured to obtain a first spectrum beam from an interaction between a first portion of a laser beam and a sample and to obtain a second spectrum beam from an interaction between a second portion of the laser beam and a reference sample, wherein the apparatus includes an optical system which is configured to guide the first spectrum beam and the second spectrum beam to a diffraction element, such as a grating, and the diffraction element is configured to split the first spectrum beam into a first spectrum of spatially separated wavelength components associated with the sample and to split the second spectrum beam into a second spectrum of spatially separated wavelength components associated with the reference sample, wherein the apparatus further includes a detector with an array of pixels for detecting the first and second spectrum, and wherein the method comprises: detecting, simultaneously and as a function of time, first data which is indicative of the first spectrum of spatially separated wavelength components on the array of pixels and second data which is indicative of the second spectrum of spatially separated wavelength components on the array of pixels, wherein the first data is collected in different pixels than the second data, determining a point spread function PSF from the second data related to a measured spectrum of the reference sample and a predetermined known spectrum of the reference sample, wherein the PSF is determined using a convolution function that provides a predetermined relationship between the PSF, a measured spectrum in the second data and the ideal spectrum of the reference sample;

determining a real spectrum of the sample using the determined PSF and the first data related to the measured spectrum of the sample.

In some embodiments, a deconvolution function, which is the inverse of the convolution function, is used to determine the real spectrum of the sample using the determined PSF and the first data related to the measured spectrum of the sample.

Features that are mentioned in connection with a device claim and that reflect a process step may also be included in a method claim.

Embodiments of the present disclosure may relate to a system including one or more processors; and one or more memories storing computer-readable instructions that, upon execution by the one or more processors, configure the system to carry out at least some of the steps of one of the methods as described herein. For example, a computer device as described herein may include one or more processors, and/or and one or more memories storing computer-readable instructions that, upon execution by the one or more processors, configure the system to carry out at least some of the steps of one of the methods as described herein.

As another example, a data acquisition device as described herein may include one or more processors, and/or and one or more memories storing computer-readable instructions that, upon execution by the one or more processors, configure the system or device to carry out at least some of the steps of one of the methods as described herein.

Furthermore, embodiments of the present disclosure may relate to one or more non-transitory computer-readable storage media storing instructions that, upon execution on a system, cause the system to perform operations in order to carry out at least some of the steps of one of the methods as described herein.

BRIEF DESCRIPTION OF THE DRAWINGS

The following detailed description, given by way of example, but not intended to limit the invention solely to the specific embodiments described, may best be understood in conjunction with the accompanying drawings, incorporated herein by reference, wherein:

FIG. 1b shows a reference sample on filter/slit of the apparatus of FIG. 1a.

FIG. 1e, FIG. 1f, FIG. 1h and FIG. 1i show laser stability measurements in which wavelength is measured over time that represent raw Raman spectra variation of polystyrene in the reference channel under laser excitation wavelength of 785 nm (FIGS. 1e) and 660 nm (FIG. 1h) and variation of raw Raman spectra of polypropylene in the main channel under laser excitation wavelength of 785 nm (FIG. 1f) and 660 nm (FIG. 1i), FIG. 1g and FIG. 1j show Raman spectra of polypropylene in the main channel versus time under laser excitation wavelength of 785 nm (FIG. 1g) and 660 nm (FIG. 1j) after real-time (i) Raman shift, (ii) Raman intensity calibrations, (iii) anti "mode hop" deconvolution and (iv) spectrum deblurring being applied.

DETAILED DESCRIPTION

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention. These and other embodiments are disclosed or are obvious from and encompassed by, the following Detailed Description.

Embodiments of an apparatus for carrying out optical spectroscopy can be denoted in the following also as Raman system or miniaturized Raman system or Raman spectrometer.

Figure 1A:
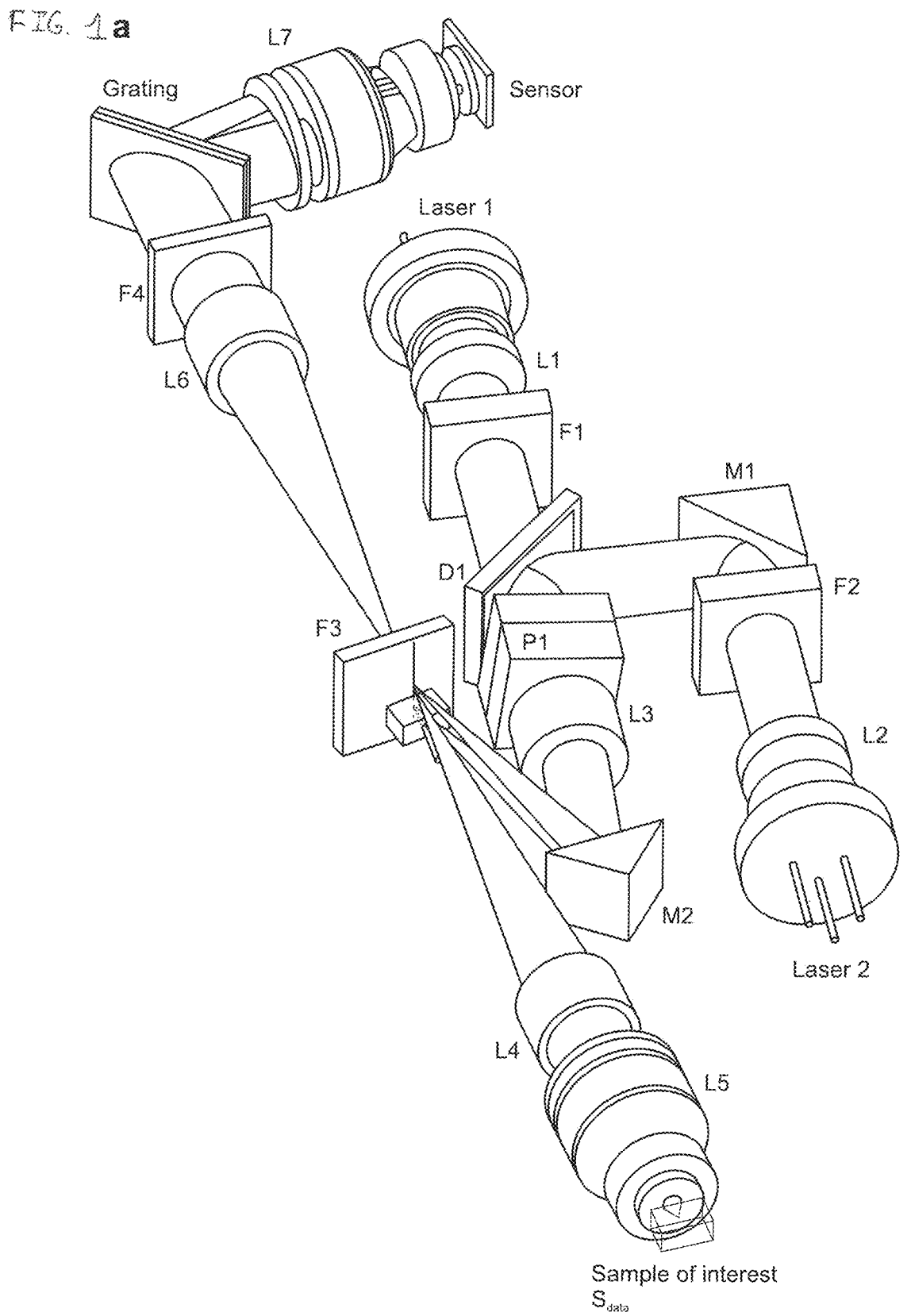
FIG. 1a shows an optical layout and working principle of an apparatus for carrying out spectroscopy.

FIG. 1a shows an optical scheme of an embodiment of a Raman spectrometer. It includes a laser 1, such as a laser diode, such an AlGaAs laser diode (AlGaAs=Aluminium Gallium Arsenide). In some embodiments, the laser diode is arranged in a TO package, for example with a diameter of 5.6 mm, and includes a Fabry-Pérot resonator at a central wavelength of 785 nm and a maximum power of 200 mW. The laser is used as a Raman source (L1). In some embodiments, the laser spectral linewidth at half maximum (LWHM) is 0.2 nm which is at least in some embodiments sufficient to obtain a spectral pixel resolution of the miniaturized Raman system of 0.3 nm. The selected type of laser requires in some embodiments precise temperature stabilization for Raman spectroscopy applications to prevent laser wavelength drift and/or a change of a laser mode. Such a change is also called a "mode hop". However, in order to avoid bulky, costly and power consuming Peltier elements for temperature stabilization of the laser, at least in some embodiments the described Raman system does not require laser wavelength stabilization.

As shown in FIG. 1a, a collimated laser beam provided by laser 1 is split into two beams using prism (P1), resulting in two different portions of the laser beam (B1) and (B2). A portion of the laser beam (B2), also denoted as first portion of laser beam B2, is focused on the slit and reflected from the Raman edge filter (F3) towards a sample and from the sample, see sample of interest S$_{data}$, a first spectrum beam (B3) (see also FIG. 1b) is obtained due to interaction, in particular Raman interaction, between the sample and the incident portion of laser beam B2.

The other portion of the laser beam, also denoted as a second portion of the laser beam (B1), is focused on a reference sample Sref. Due to interaction, in particular Raman interaction, between the reference sample and the second portion of laser beam (B1), a second spectrum beam is generated.

In some embodiments, the reference sample Sref is a polystyrene reference sample. In some embodiments, the reference sample is glued to a Raman edge filter (F3). In some embodiments, the Raman edge filter (F3) is coated with an aluminium mask. The mask serves as a spectral slit. The coating forming the aluminium mask is arranged on one surface of the filter. In some embodiments, the spectral slit is not arranged on a front side of a filter F3, but on the opposite side.

As a result, two spectrum beams are obtained whereof one spectrum beam comprises the Raman spectrum of the sample of interest, while the other spectrum beam comprises the known Raman spectrum of the reference sample. The beam that carries the Raman spectrum from the sample is called first spectrum beam and the beam that carries the Raman spectrum from the reference sample S$_{ref}$ is called second spectrum beam.

The apparatus shown in FIG. 1a includes an optical system with lenses and mirrors, such as lenses L1, L2, L3, L4, L5, L6 and L7, mirrors, such as mirrors M1 and M2, and filters, such as filters F1, F2 and F3. The optical system is designed to guide the first spectrum beam and the second spectrum beam to a diffraction element, which is in the embodiment shown in FIG. 1a a grating, such as a transmissive Bragg grating. The grating splits the first spectrum beam into a first spectrum of spatially separated wavelength components and the second spectrum beam into a second spectrum of spatially separated wavelength components. The first spectrum is related to the sample of interest and the second spectrum is related to the reference sample for which the spectrum is known.

The apparatus as shown in FIG. 1a includes a detector, also called sensor, that comprises an array of pixels for detecting the first spectrum and the second spectrum. The spatially separated wavelength components of the first and second spectra care usually separated from each other in one direction, here called spectral direction, but the spectra usually do not have a larger extension in a width direction, which is perpendicular to the spectral direction, where both directions extend in the plane defined by the array of pixels. The width of a spectrum in the width direction is in some embodiments close to the size of a pixel.

Figure 1B:
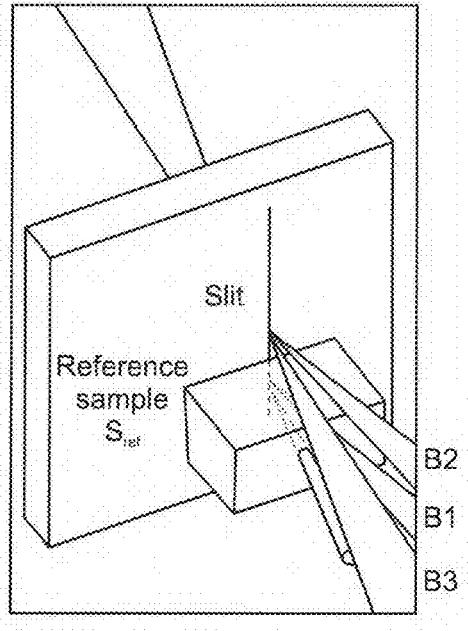
Figure 1C:
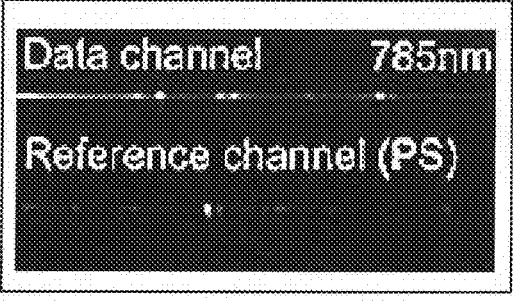
FIGS. 1c and 1d show sensor images that demonstrate simultaneous acquisition of main and reference Raman signals from laser excitation at 785 nm (FIG. 1c) and 660 nm (FIG. 1d). Each image represents a Raman spectrum of a water-ethanol solution (60:40) in the main channel and a Raman spectrum of polystyrene in the reference channel.
Figure 1D:
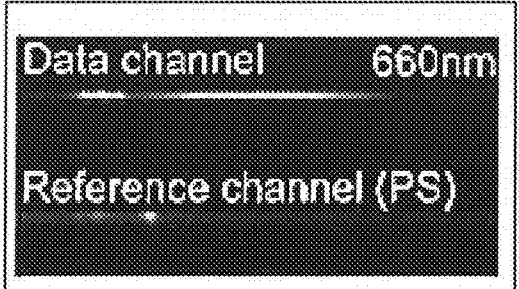

FIGS. 1c and 1d show images of the array of pixels. In a so-called main or data channel, the first spectrum related to the sample of interest is detected, and in a so-called reference channel, the second spectrum related to the reference channel is detected. Here, the spectral directions run along the horizontal axis and the width direction runs along the vertical axis of the array of pixels. The array of pixels can in particular be arranged such that the spectral direction extends along a line of pixels, such that a respective spectrum can be detected by one line of pixels or a small amount of adjacent rows of pixels, such as 2, 3, 4, or 5 adjacent rows of pixels.

More specifically, FIG. 1c shows a first spectrum of the sample collected in the data channel and a second spectrum of the reference sample collected in the reference channel as obtained from the first and second portions of the laser beams generated from laser 1. The laser 1 is operating at a wavelength of 785 nm.

In some embodiments, the apparatus can comprise a second laser (laser 2). In some embodiments, the second laser (laser 2) operates at a wavelength of 660 nm. A first portion of a laser beam and a second portion of a laser beam can also be obtained from laser 2, which can then be used to generate a first spectrum beam and a second spectrum beam as explained before. After the dichroic mirror D1, the beams generated by laser 1 and laser 2 can be aligned. Thus, in some embodiments, after the dichroic mirror D1, laser irradiation from the second laser L2 propagates through the same optical path as B1-B3, which are obtained using the first laser L1, and targets the reference sample S$_{ref}$ on the slit or the sample of interest S$_{data}$. Therefore, the optical system does not have to be adjusted depending on whether laser 1 or laser 2 is in operation. In the device shown in FIG. 1a, however, only one laser is operated at any given time. In some embodiments, the dichroic mirror is transmissive for laser light from laser 1 and reflective for laser light from laser 2.

FIG. 1d shows the first spectrum of the sample collected in the data channel and the second spectrum of the reference sample collected in the reference channel as obtained from the first and second portions of the laser beams generated from the second laser (laser 2), which is operating at 660 nm.

As the first portion of the laser beam and the second portion of a laser beam are generated from a single laser beam either from the first laser or the second laser, the Raman spectra from both beams, for example in a "fingerprint" range between 400-2700 cm-1, are simultaneously collected by the pixel array of the sensor. In some embodiments, the sensor is a NIR enhanced imaging CMOS sensor.

The optical system of the apparatus of FIG. 1a is at least in some embodiments set up such that the two Raman beams travel slightly offset from each other. Therefore, the Raman spectra of the sample and reference sample are collected in different areas on the pixel array of the detector. Therefore, the data channel and the reference channel may be located in different areas of the array of pixels, as shown in FIGS. 1c and d. The offset between the Raman beams may be caused by the beam splitter used to generated the first and second portions of the laser beam, as the two portions leave the beam splitter in slightly different directions, so that there beam paths do not overlap in the optical system.

The optical system for guiding the first spectrum beam and the second spectrum beam is also denoted as Raman beam delivery system. It includes or consists of the reference sample (see FIG. 1b), a lens L5, which is also called Raman probe lens L5, a slit lens L4 and a spectrometer. The spectrometer includes or consists of optical elements F3, L6, F4, the grating, and focusing lens L7, and the sensor, which is for example a CMOS sensor.

In some embodiments, a spectral slit size of a slit on the filter F3 is 25 $\mu$m, which is zoomed down to 5.4 $\mu$m on the focal plane, which is on the array of the sensor 123 having a binned pixel size of 4 $\mu$m. The imaging capabilities of lens L7 may provide uniform resolution along the spectral dimension on the sensor at or close to diffraction limited spot size. This makes it possible to concentrate most of the Raman signal intensity into a single row of the sensor (see FIG. 1c).

In some embodiments, the grating is a fused silica transmission Bragg grating with average efficiency in the first order of diffraction ~96% in the range of 800-960 nm. In combination with NIR coating for all optical elements (NIR for near infrared), the optical system may provide an extremely high throughput from the sample to the detector of about 92%. The described elements may significantly boost sensitivity of miniaturized Raman spectrometer.

In some embodiments, the second laser L2 serves to cover a "high frequency" Raman range. In some embodiments, the second laser is an AlGaInP laser diode 125 (L2) with a Fabry-Perot resonator L2 with a central wavelength of 675 nm, LWHM 0.2 nm and a maximum power of 200 mW (AlGaInP=Aluminium Gallium Indium Phosphide). In some embodiments, the second laser (L2) and the main laser (L1) are switched on sequentially, providing two different Raman shift ranges with the same grating. Using two lasers may make it possible to collect in the "high frequency" Raman range by the same optical elements in the same spectral range 800-960 nm that is used for collection of the "fingerprint" range. In some embodiments, this strategy allows to maintain a high SNR (SNR=signal to noise ratio) for Raman spectra in the "high frequency" range due to relatively high QE (QE=quantum efficiency) of the CMOS (60% at 840 nm, 40% at 940 nm) sensor in the range 800-960 nm (CMOS=complementary metal-oxide semiconductor). In some embodiments, the miniaturized Raman spectrometer is capable of collecting combined Raman spectrum in the range of 400-4000 cm$^{-1}$ reaching the performance typically associated with much larger, research grade systems.

As mentioned before, in some embodiments, data channels for 785 nm and 660 nm (see FIGS. 1c and 1d) are collected one by one, not simultaneously, because their spectral lines overlap on the sensor and a simultaneous measurement is not possible. In some embodiments, however, after two consecutive measurements of data may be automatically appended by software in a data acquisition device of the apparatus to provide one 400-4000 cm-1 spectrum for the sample. The data acquisition device may be a computing device.

The data detected on the array of pixels is in particular an intensity distribution of the wavelengths in the first spectrum and the second spectrum. Thus, first data, which is measured for the first spectrum of the sample on the array of pixels, may correspond to an intensity distribution over the pixels of the array of pixels that is detected over time either continuously or stepwise. Second data, which is measured for the second spectrum of the reference sample on the array of pixels, may correspond to an intensity distribution measured on the array of pixels over time either continuously or from time to time. In some embodiments, the array of pixels is divided in two areas, for example an upper and a lower area. Data measured in the upper area is considered data for the data channel and data measured in the lower area is considered data for the reference channel (see FIGS. 1c and 1d). This is possible, as the first spectrum and the second spectrum are spatially separated from each other on the array of pixels as explained before due to the design of the optical system.

The data measured by the array of pixels is provided to a data acquisition device which is connected with the array of pixels. The raw data as obtained by the data acquisition device can be stored on a storage device on the data acquisition device and the data can be further processed as will be described in more detail in the following.

The raw Raman spectra from the reference and data channel which are collected as a function of time are shown in FIGS. 1e to 1i. Time-lapse experiments as depicted in FIGS. 1e to 1i clearly show a peak shift of polystyrene in the reference channel and polypropylene in the data channel, which may be caused by a drift of laser wavelength as the laser may not be wavelength stabilized. However, due to the fact that signals in both, the reference channel and the main channel, are collected from the same laser source and acquired simultaneously by the imaging sensor, a wavenumber calibration for each collected Raman spectrum in the data channel can be applied using the simultaneously acquired Raman spectrum in the reference channel. In some embodiments, wavelength calibration is done by peak fitting of one or more prominent peaks in the spectrum of the reference sample, such as polystyrene peaks, measured in the reference channel and correcting for their known position (see wavelength axis in FIGS. 1e to 1i). The same correction is then applied to the data obtained in the data channel. The result for wavenumber calibration versus time is shown in FIG. 1k, demonstrating high and stable calibration accuracy (±1.5 cm-1) using multiple peaks of polystyrene measured by the reference channel channel.

Figures 1K, 1L, 1M, 1N, 1O, 1P, 1Q:
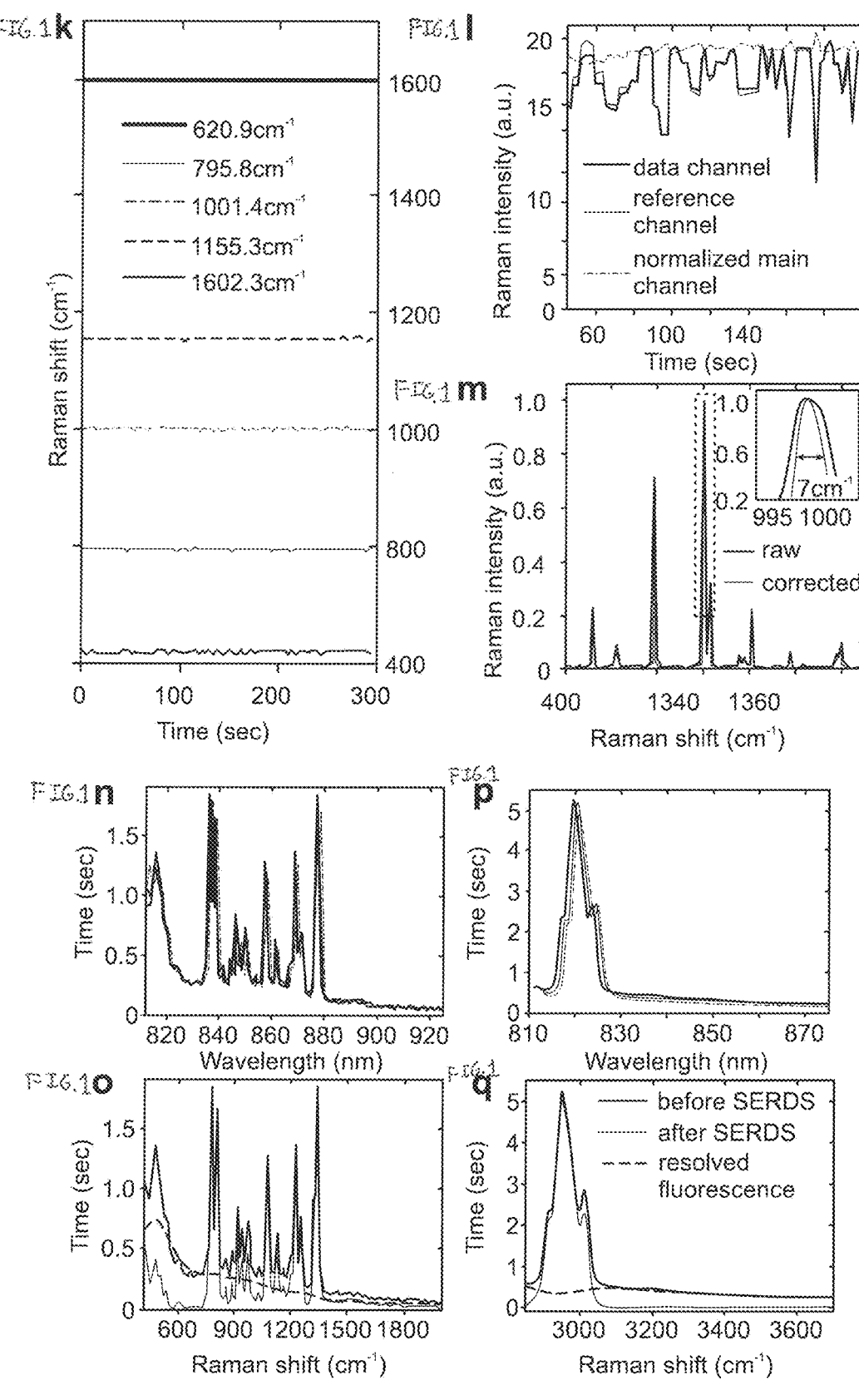
FIG. 1k and FIG. 1l show time dependent experiments of a polystyrene sample placed in the main channel that demonstrates long time calibration stability of the Raman shift (FIG. 1k) and Raman intensity (FIG. 1l).
FIG. 1m shows a Raman spectrum of toluene before (raw curve) and after (corrected curve) multiple pre-processing procedures have been applied.
FIG. 1n and FIG. 1p show shifted-excitation Raman spectra of polypropylene at different time points from the experiment in FIGS. 1f and 1i.
FIG. 1o and FIG. 1q demonstrate fluorescence free Raman spectra obtained after subtraction of resolved fluorescence profiles from initial Raman spectra.
Figures 2A, 2B:
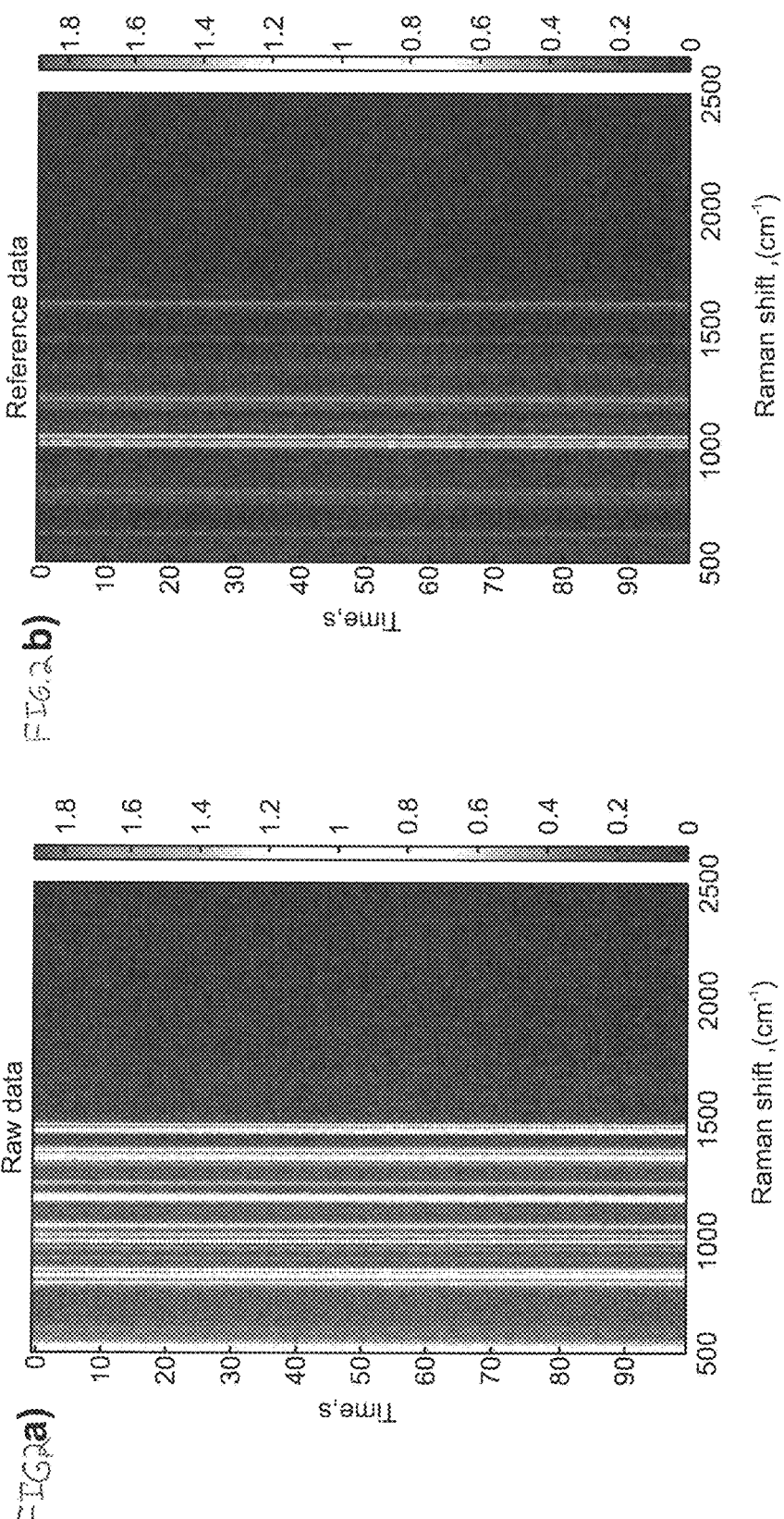
FIG. 2a shows an image of a sensor which shows first data measured as raw data over time for a spectrum of a sample.
FIG. 2b shows an image of the sensor which shows second data measured over time for a reference spectrum of a reference sample.

At the same time, FIG. 1*l* demonstrates that Raman intensities in the reference and data channels are correlated. Therefore, it is possible to normalize intensities measured in the data channel for laser power fluctuations during each spectrum acquisition (see normalized main channel in FIG. 1*l*). Thus, embodiments of the described apparatus provide an excellent solution for quantitative Raman spectroscopy applications where a laser intensity monitoring is carried out to reduce concentration determination error.

The described wavenumber and laser intensity calibrations fail, if a fast laser wavelength change occurs. This may be due to a laser "mode hop", where the laser abruptly changes its operating mode causing a small shift of the spectra on the array of pixels. In this case, even at short exposure times, for example at exposure times smaller than 0.2 seconds, the spectra will be collected at a reduced spectral resolution and decreased peak intensity, because the energy per wavelength in a spectrum is spread over several individual pixels. In some embodiments, this problem can be solved by spectral deconvolution of the data main channel based on the known spectral profile of the reference sample in the reference channel. Such a deconvolution procedure may significantly help in recovering the original spectral resolution and Raman intensity during a "mode hop" process.

In some embodiments, the data acquisition device is configured to simultaneously measure first data which is indicative of the first spectrum of spatially separated wavelength components over time by use of the array of pixels, and second data which is indicative of the second spectrum of spatially separated wavelength components over time by use of the array of pixels.

The data acquisition device is further configured to determine, for example as a function of time, a point spread function, also called PSF, from the second data, which is related to the measured spectrum of the reference sample and a pregiven known spectrum of the reference sample, herein also called ideal spectrum of the reference sample. For the determination of the PSF, the data acquisition device uses a convolution function that provides a predetermined relationship between the PSF, the measured spectrum as obtained from the second data and the ideal spectrum of the reference sample. Furthermore, the data acquisition device is configured to determine a real (also called ideal) spectrum of the sample from the determined PSF and the first data related to the measured spectrum of the sample.

In some embodiments, the data acquisition device is configured to the real spectrum of the sample from the determined PSF and the first data related to the measured spectrum of the sample by use of a deconvolution function, which is the inverse of the convolution function.

The convolution function and the deconvolution function can be stored, by use of computer program code, for example, on storage of the data acquisition device and it can be executed by a processor of the data acquisition device to carry out the corresponding steps as described herein.

The PSF represents the optical system's impulse response of a focused optical imaging system. As the second data provides the raw or measured spectrum of the reference sample of which the ideal spectrum is known, the PSF can be determined from the predetermined or pregiven relationship in form of a convolution function or method that links the PSF, the measured spectrum and the ideal spectrum. Once the PSF has been determined, it can be used in conjunction with the first data obtained for the measured spectrum of the sample to calculate an "ideal" spectrum of the sample of interests. Thereby a deconvolution function or method is applied which is inverse to the previously used convolution function or method.

In some embodiments, as the first and second data is obtained over time, the PSF is also determined as a function of time. Furthermore, in the calculation, only simultaneously detected first and second data is taken into account.

In some embodiments, the data acquisition device is configured to detect a predefined event, when the event occurs during a measurement of the first and second data. The data acquisition device may be configured to carry out the above mentioned steps of determining the PSF and the ideal spectrum of the sample only in response to the detection of the predefined event.

In some embodiments, the data acquisition device determines the event by detecting a predefined characteristic in the second data, such as an abrupt shift of a peak in the spectrum of the reference sample on the pixel field. Therefore, the data acquisition device may in some embodiments be configured to continuously identify at least one peak in the spectrum of the reference sample, which is included in the second data, and to continuously monitor the position of the peak on the array of pixels. In some embodiments, the data acquisition device determines the event by detecting a predefined characteristic in the first data, such as an abrupt shift of a peak in the spectrum of the sample on the pixel field. Thus, in some embodiments, the predefined event may cause a movement or shift of the first spectrum or the second spectrum on the array of pixels during a measurement, which can be indicative of a mode hop occurring in the laser which is used to provide the laser beam, see for example laser 1 and laser 2 in FIG. 1*a*.

A Raman spectrum obtained in the first or second data can be regarded as a blurred signal which can be written as convolution of PSF and real or ideal signal.

$$\tilde{f}(x) = \int_{-\infty}^{\infty} psf(x - X) f(\chi) \, d\chi = psf * f \tag{1}$$

In matrix form $$\tilde{f} = \hat{A}_{psf} f = \hat{A}_f \cdot psf \tag{2}$$

The above equation represents symmetry properties of convolution. The formulas (1) and (2) therefore provide a convolution function or method that relates ideal and measured signal via the PSF with each other. It allows estimating a PSF using ideal and blurred signals, in particular as outlined above using a measured spectrum obtained from the second data and the known ideal spectrum of the reference sample. Once the PSF is known, an ideal spectrum of the sample to be known can be determined from the PSF and the measured spectrum in the first data by use of a deconvolution function, which is inverse to the convolution function. In some embodiments, the data acquisition apparatus is configured to carry out the above described procedure and to calculate the spectrum of the sample employing equation (1) or (2) or a formula derived therefrom.

When composing of equation (2), in some embodiments boundary conditions may be taken into account, such as reflexive boundary conditions may be used for the signal restoration. In some embodiments, predefined boundary conditions of the optical system are included in at least one of the following: the convolution function and the deconvolution function.

The PSF obtained from equation (1) or (2) can be used for the deblurring of measured signals. Since a measured blurred signal may comprise noise, in some embodiments, a solution may be found in sense of least squares.

A PSF estimation problem can be rewritten as a classical least squares problem:

$$psf = \text{argmin}_x \|y - \hat{A}x\|_2^2 \tag{3}$$

To constrain result to be non-negative, NNLS (NNLS=non-negative least squares) may be used:

$$psf = \text{argmin}_x \|y - \hat{A}x\|_2^2 \text{ subject to } x \geq 0 \tag{4}$$

These problems are ill-posed and regularization steps are required. At least one of the following types of regularization may be considered:

L1 Regularization $$psf = \text{argmin}_x \|y - \hat{A}x\|_2^2 + \lambda \|x\|_1^2 \tag{5}$$

L2 Regularization (Robust Regression)

$$psf = \text{argmin}_x \|y - \hat{A}x\|_2^2 + \lambda \|x\|_2^2 \tag{6}$$

L2 Smooth Regularization $$psf = \text{argmin}_x \|y - \hat{A}x\|_2^2 + \lambda \|\hat{D}_2 x\|_2^2 \tag{7}$$

Here $\hat{D}_2$ is a second derivative matrix.

In at least some embodiments, the data acquisition device can be configured to employ at least one of the types of regularization for determining the PSF and the ideal spectrum of the sample.

Figures 3, 4:
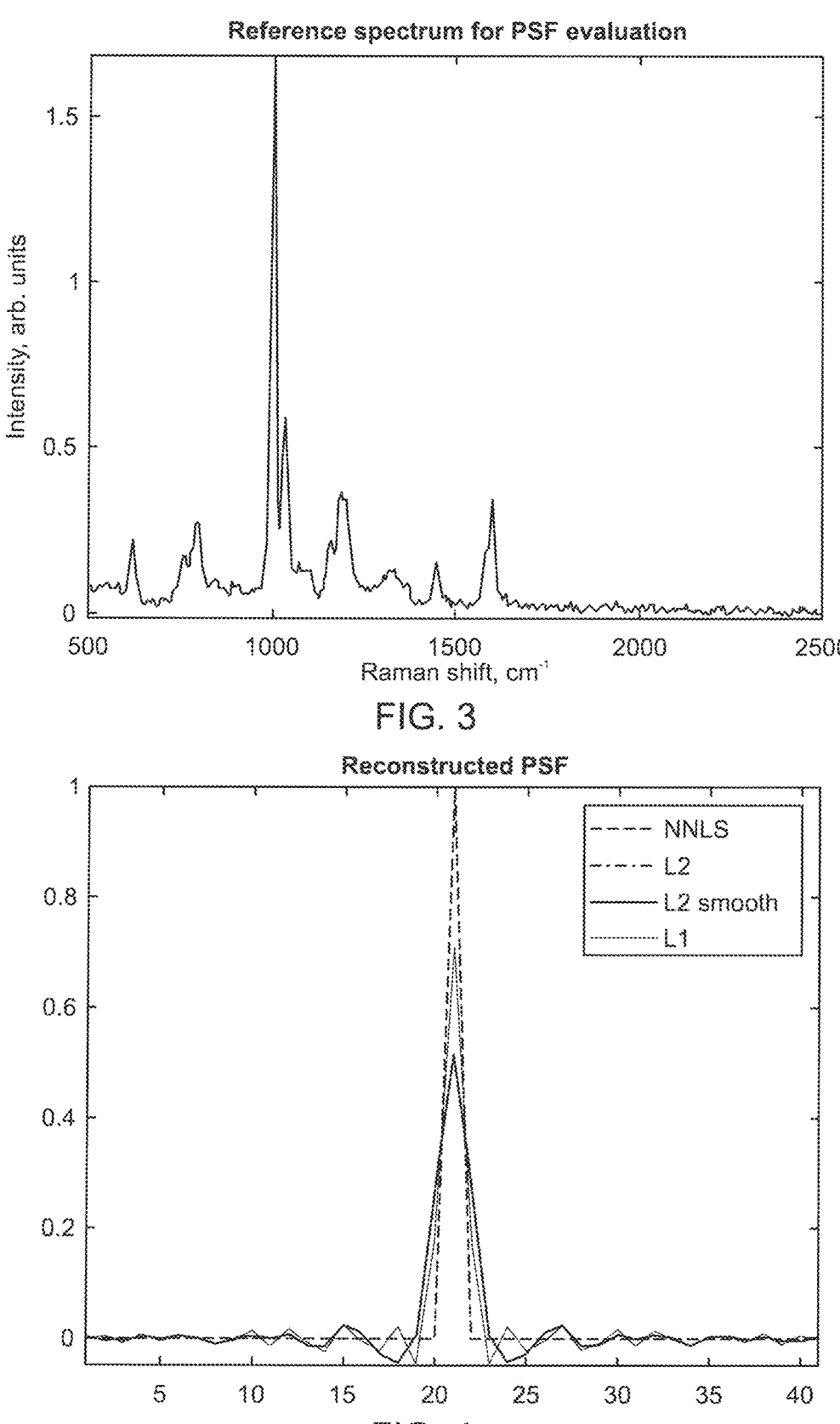
FIG. 3 shows a reference spectrum used as ideal for PSF evaluation.
FIG. 4 shows a PSF obtained for the same input and output spectra.
Figure 5:
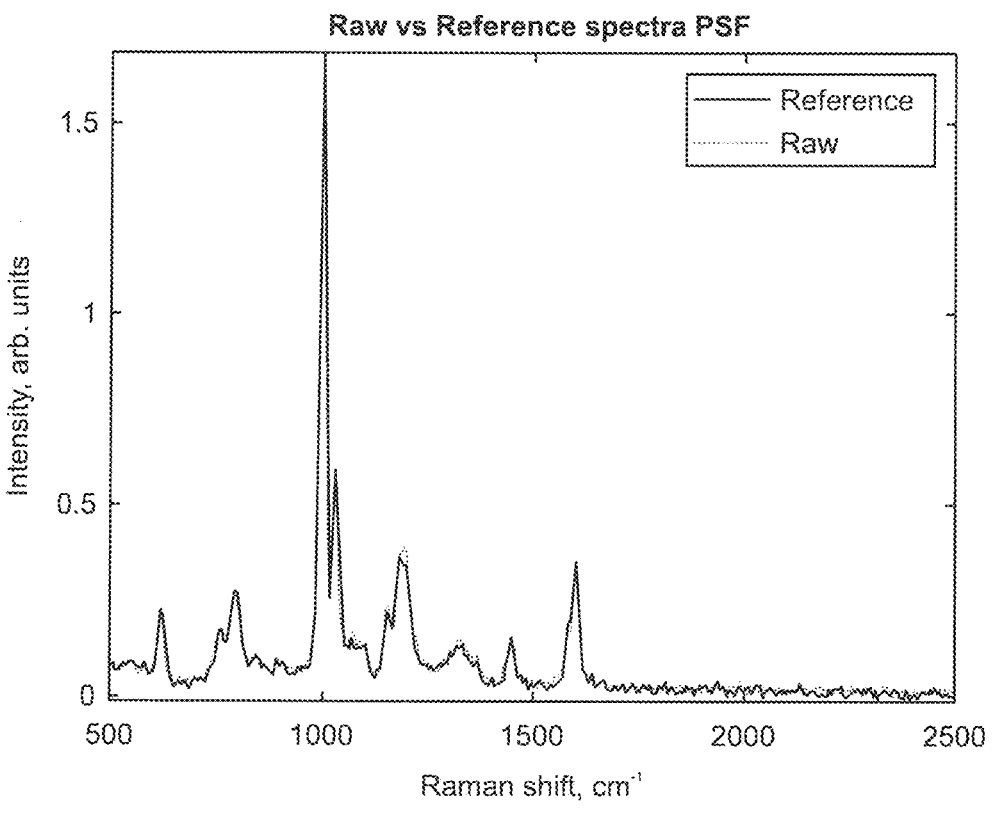
FIG. 5 shows "raw" and 'ideal' reference spectra.
Figure 6:
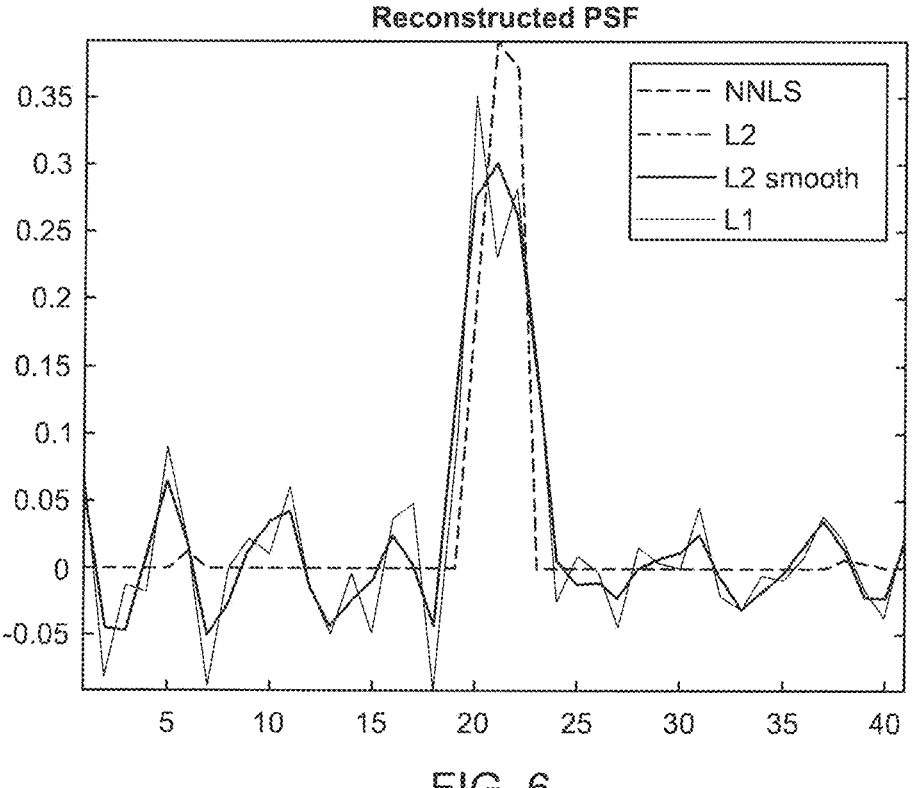
FIG. 6 illustrates the use of a reconstructed PSF.

In some embodiments, a value of the regularization parameter of $\lambda=0.01$ for all equations (5)-(7) is used. In some embodiments, a PSF is obtained for the situation where the 'ideal' reference spectrum is used both as input and output. A reconstructed PSF where the 'ideal' reference spectrum is used for both, as input and output is shown in FIG. 4.

In some embodiments, in the data acquisition device, a second PSF obtained from a second reference sample, such as diamond or calcite, is provided, and the data acquisition device is configured to determine a deblurred ideal spectrum of the sample using the second PSF. The second PSF can be provided on a storage of the data acquisition device. At least in some embodiments, the second reference sample is not included in the apparatus for correcting the optical PSF, but a measurement of the spectrum of the second reference sample may be done only once during initial calibration and a corresponding deconvolution function may be applied. Thus, at least in some embodiments, the second reference sample may not be used for providing a signal in a reference channel. In some embodiments, the second PSF may be taken into account for correcting an optical PSF degradation, which may happen due to misalignment or temperature variations.

In some embodiments, the data acquisition device is configured to carry out a wavelength calibration over time on the first data using the second data that has been simultaneously detected. As described before, one or more peaks can be detected in the second data. As the spectrum of the reference sample is known, the wavelength of each peak can serve to calibrate the spectrum of the reference sample along the spectral direction (see horizontal axis in FIGS. 1c and 1d) and, correspondingly, to calibrate the simultaneously measured spectrum of the sample.

Thus, in some embodiments, the data acquisition device is configured to identify in the second data at least one peak of the reference spectrum and to employ the identified at least one peak for wavelength calibration of the first data.

In some embodiments, the data acquisition device is configured to measure an intensity over time of at least one of the following: the first portion of a laser beam, the second portion of the laser beam, a common laser beam from which the first and second portions of the laser beam are generated, an intensity of the first spectrum, an intensity of the second spectrum. In some embodiments, the data acquisition device is configured to employ the measured intensity for normalizing simultaneously measured intensity values, which are included in the first data (see also FIG. 1l).

In some embodiments, the data acquisition device is configured to calculate an intensity over time of the second spectrum from the second data and to employ the calculated intensity for normalizing simultaneously measured intensity values which are included in the first data. Intensity normalization can be applied as shown in FIG. 1l.

In some embodiments, a k-th measured reference spectrum may be represented as $$\tilde{y}_k^r = E_k^r (psf * y_0^r) \tag{8}$$

Tilde means that spectrum is not normalized. In some embodiments a non-normalized PSF and a reference spectrum is employed for the reconstruction. The signal model can be rewritten as:

$$\tilde{y}_k^r = (\widetilde{psf} * \tilde{y}_n^r) = E_0^r (\widetilde{psf} * y_0^r) \tag{9}$$

A relationship between a normalized psf and non-normalized $\widetilde{psf}$ point-spread functions can be obtained by comparing Eqs. (8) and (9):

$$E_0^r \cdot \widetilde{psf} = E_k^r \cdot psf \tag{10}$$

The model of measured data spectrum is the following:

$$\tilde{y}_k^d = E_k^d (psf * y_{0k}^d) \tag{11}$$

In some embodiments, non-normalized PSF may be used for the reconstruction. The model may be the following:

$$\widetilde{y_k^d} = (\widetilde{psf} * \widetilde{y_k^a}) \tag{12}$$

Where $\widetilde{y_k^d}$ is the non-normalized spectrum. Using Eq. (10) we can rewrite Eq. (12) as $$\widetilde{y_k^d} = \frac{E_k^r}{E_0^r}(psf * \widetilde{y_k^a}) \tag{13}$$

By comparing Eqs. (11) and (13) the following is obtained:

$$y_k^d = E_k^d y_{0k}^d = \frac{E_k^r}{E_0^r} \cdot \widetilde{y_k^d} \tag{14}$$

Figure 7:
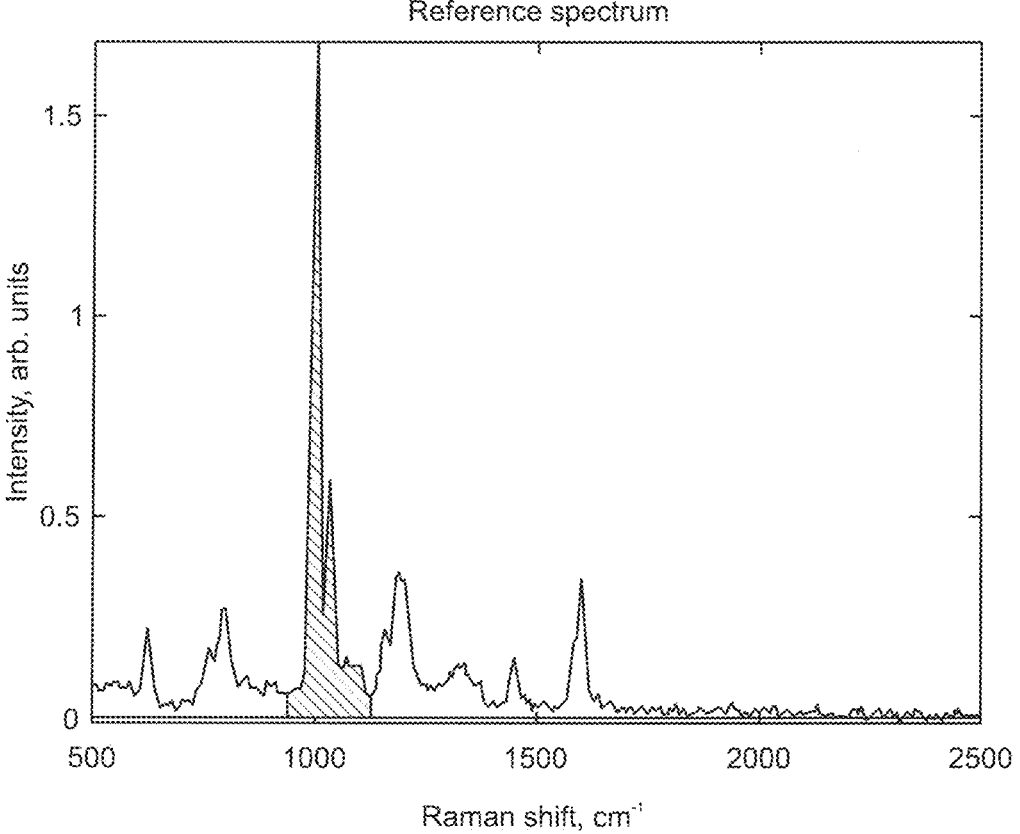
FIG. 7 shows a reference spectrum and illustrates a range in the spectrum used for intensity normalization.

In some embodiments, a 938-1128 cm$^{-1}$ range for the intensity normalization is selected and illustrated in FIG. 7 as shown for the reference spectrum.

In some embodiments, the apparatus includes at least one laser, such as laser 1 and laser 2 as shown in FIG. 1a, for generating the first and second portions of the laser beam. The laser beam is split into the first and second portions of the laser beam by use of a beam splitter, see beam splitter P1 in FIG. 1a, or any other suitable optical device. The beam splitter may be configured to split the first and second portion of the laser beams such that the two beams take paths through the optical system that are offset from each other. Therefore, the first portion of the laser beam can be focused on the sample, but the first portion of the laser beam B2 and the first spectrum beam B3 run past the side of the reference sample without hitting it as illustrated in FIG. 1b. On the other hand, the second portion of the laser beam B1 is hitting the reference sample, and the second Raman beam originating from the interaction between the second portion of the laser beam B1 and the reference sample is guided to the array of pixels of the sensor. In some embodiments, each of the first and second spectrum beam is focused to a focal point when passing through the slit, wherein the focal point of the first spectrum beam is shifted from the focal point of the second spectrum beam (see also in FIG. 1b).

FIG. 1b shows that the reference sample is arranged on the surface of a filter F3, which also provides on one of its surfaces a slit. The slit may be arranged in form of a material coating, such as a metal coating, on the surface of the filter.

In some embodiments, the laser is at least one of the following: a non-wavelength stabilized laser, a non-temperature stabilized laser, a tunable laser, a diode laser.

In some embodiments, the apparatus includes an optical system, which includes a slit or a pinhole through which first and second spectrum beams are guided before they pass through the diffraction element. As shown in FIG. 1b, a slit may be arranged on a surface of a filter in some embodiments. A width of the slit or a diameter of the pinhole may be larger than an optimal value for the width of diameter. The optimal value may be associated with the pixel limited spectral resolution of the array of pixels. In some embodiments, a pixel limited spectral resolution of the apparatus is 5.6-3.4 cm$^{-1}$ in the range of 400-2000 cm$^{-1}$ using laser excitation at 785 nm. This corresponds to an optimal slit size of around 18 µm. In some embodiments, the actual slit size is nevertheless up to 25 µm for increased signal throughput, which transfers into a calculated spectral resolution of 10.2-5.8 cm$^{-1}$. Deviation from diffraction limited optics design may lead to an even worse resolution. However, it is possible to measure the spectral apparatus function of the entire Raman system and compensate on it using in some embodiments deblurring methods. In some embodiments, the Raman spectrum of diamond with natural linewidths of around 1.8 cm$^{-1}$ may be used for the determination of the spectral apparatus function. Another example of a useful material other than diamond is calcite.

FIG. 1m illustrates improvements in terms of spectral resolution after correction on "mode hop" and spectral deblurring, thereby demonstrating for some embodiments a final high spectral resolution of around ~7 cm$^{-1}$ in a bad case scenario. Thus, in some embodiments, the width of the slit or the diameter of the pinhole corresponds to or is larger than 1.2 or 1.3 or 1.4 or 1.5 time the optimal value.

In some embodiments, the apparatus comprises an optical system configured to compress a width of the first spectrum and a width of the second spectrum at the location of the detector to a value, which is in the range of the size of a pixel or optionally lower than the pixel size. For example, the pixel size may be 4 µm, and the width is measured in a plane of the pixel surface and in a direction which is orthogonal to a spectral direction of the spectra. Thereby, when no mode hop occurs, at least most of the intensity per wavelength can be detected by one pixel or a small amount of adjacent pixels, which helps to improve the signal to noise ratio of the detected signal.

Figure 8:
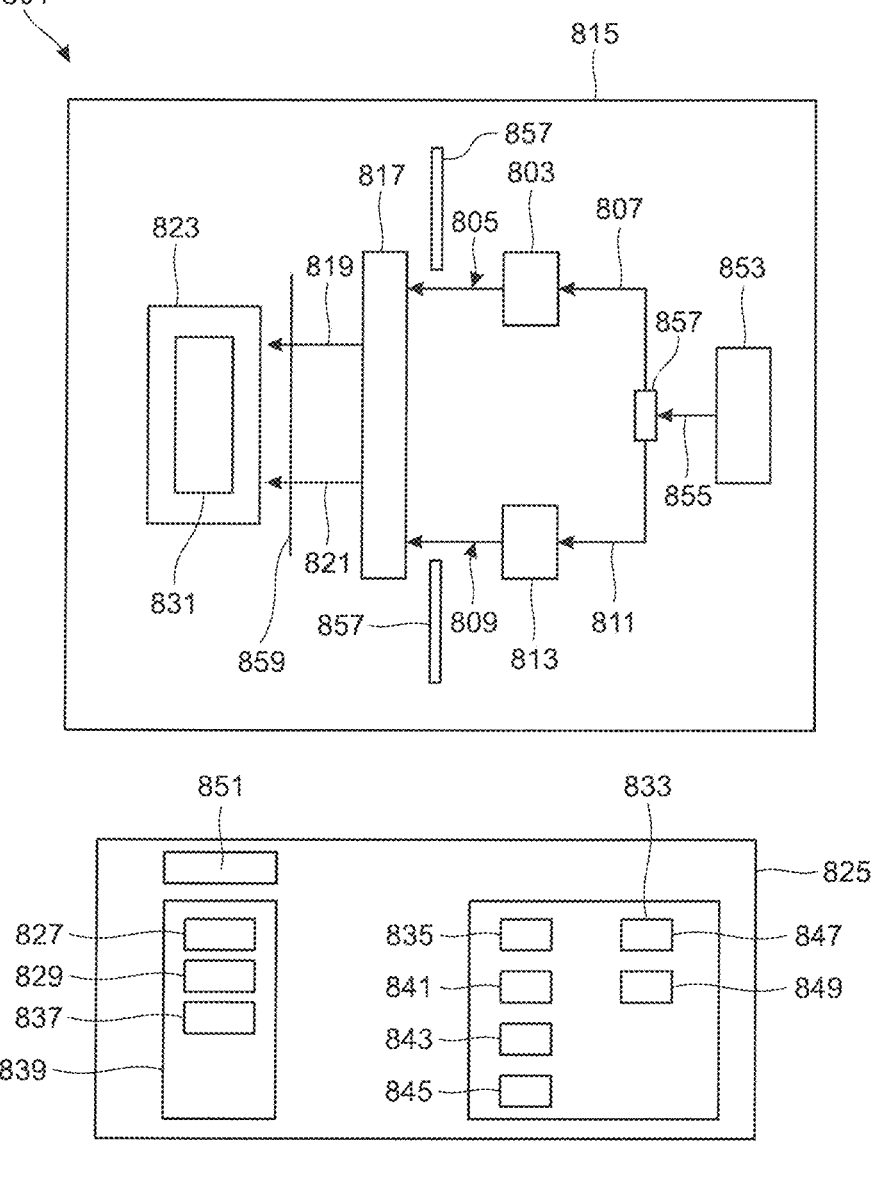
FIG. 8 shows a block diagram of an exemplary apparatus for carrying out spectroscopy.

FIG. 8 shows a block diagram of an embodiment of an apparatus 801 for carrying out spectroscopy, in particular Raman spectroscopy, on a sample 803. The apparatus is configured to obtain a first spectrum beam 805 from an interaction between a first portion of a laser beam 807 and the sample 803 and a second spectrum beam 809 from an interaction between a second portion of the laser beam 811 and a reference sample. An optical system 815 of the apparatus guides the first spectrum beam 805 and the second spectrum beam 811 to a diffraction element 817, such as a grating or a transmissive Bragg grating. The diffraction element 817 splits the first spectrum beam 805 into a first spectrum 819 of spatially separated wavelength components associated with the sample 803 and the second spectrum beam 809 into a second spectrum 821 of spatially separated wavelength components associated with the reference sample 803. The apparatus includes a detector 823 with an array of pixels 831 for detecting the first and second spectrum 819, 821.

The apparatus 801 further includes a data acquisition device 825 which is configured to carry out at least one measurement using the detector 823. In operation, the data acquisition device 825 detects simultaneously first data 827 which is indicative of the first spectrum 819 as a function of time on the array of pixels 825 and second data 829 which is indicative of the second spectrum 821 over time by use of the array of pixels 831, wherein the first data 827 is collected in different pixels than the second data 829.

The data acquisition device 825 is further configured to process the measured data. In particular, a processor 833 of the data acquisition device 825 carries out the step of determining a point spread function PSF 835 from the second data 827 and a predetermined known spectrum 837 of the reference sample 813. Data associated with the known spectrum 837 can be stored on a storage 839 of the data acquisition device 825, so that the known spectrum 837 is accessible for the processor 833.

The processor 833 further determines the PSF function by use of a convolution functionality 841 that provides a predetermined relationship, see for example equations (3) to (5) between the PSF 835, a measured spectrum as obtained from the second data 829 and the known spectrum 837 of the reference sample 813. The known spectrum 837 is also called ideal spectrum of the reference sample 813. Further, in operation, the processor 833 determines an ideal spectrum 847 of the sample 803 from the determined PSF 835 and the first data 827 related to the sample 803 by use of a deconvolution functionality 843, which is the inverse of the convolution functionality 841.

Data entries, such as measured intensity values over the array of pixels, that were measured at the same time were used from the first data 827 and from the second data 829 for the convolution and deconvolution steps. Thus, simultaneously measured data obtained in the data and reference channel (see also FIGS. 1 c and d) were used.

The convolution and deconvolution functionality 841, 843 can be implemented in form of computer executable program code, which is stored on storage 839, and which carries out the above-mentioned steps and further steps as described herein when loaded and executed by processor 833.

In some embodiment, the data acquisition device 825 detects a predefined event, such as a mode hop of a laser from which the first and second portions of the laser beams are obtained. The data acquisition device 825 is further configured to carry out the above-mentioned steps only in response to the detection of the predefined event.

In some embodiments, the data acquisition device 825 uses a second PSF 845, which can be stored on the storage 839 and which can be associated with a second reference sample, such as diamond. The data acquisition device 825 deblurs the ideal spectrum 847 and determines further improved ideal spectrum 849 from the ideal spectrum 847 and the second PSF 845. The ideal spectrum 847 or the further improved ideal spectrum 849 can be visualized on a display 851 of the data acquisition device 825.

In some embodiments, the data acquisition device 825 carries out a wavelength calibration over time on the spectrum of the sample as provided in the first data 827 using the second data 829 that was simultaneously detected.

In some embodiments, the data acquisition device 825 determines in the second data 829 at least one peak of the reference spectrum 813 and employs the peak for wavelength calibration of the first data.

In some embodiments, the data acquisition device calculates, by use of the processor, a momentary total intensity of the second spectrum 821 from the second data 829 and uses the calculated intensity for normalizing simultaneously measured intensity values, which are included in the first data 827. Alternatively, the intensity of a laser beam, for example, or the intensity of the second spectrum 821 may be measured by use of a measurement element and the measured intensity may be used for normalization of the first spectrum 819.

In some embodiments, one laser 853 provides a laser beam 855 for generating the first and second portions 807, 811 of the laser beam. A beam splitter 857 is used to split the laser beam 855 into the first and second portions of the laser beam. The laser 855 may be at least one of the following: a non-wavelength stabilized laser, a non-temperature stabilized laser, a tunable laser, a diode laser.

In some embodiments, the optical system 815 includes a slit 857 or a pinhole through which the first and second spectrum beams 805, 809 are guided before they pass through the diffraction element 817. A width of the slit 857 or a diameter of the pinhole is larger than an optimal value for the width or diameter. The optimal value is associated with the pixel limited spectral resolution of the array of pixels 831. In some embodiments, the width of the slit or the diameter of the pinhole corresponds to or is larger than 1.2 or 1.3 or 1.4, or 1.5 time the optimal value. In some embodiments, the reference sample 813 is arranged on one side of an element that carries the slit or pinhole. In some embodiments, each of the first and second spectrum beam 805, 809 is focused to a focal point when passing through the slit 857 or pinhole such that the focal point of the first spectrum beam 805 is shifted from the focal point of the second spectrum beam 809. Thus, the two spectrum beams 805 and 809 are focused to different focal points.

In some embodiments, the optical system 815 includes a lens 859 which focuses and thereby compresses a width of the first spectrum 819 and a width of the second spectrum 821 at the location of the detector 823 to a value which is in the range of the size of a pixel and preferably lower than the pixel size. For example, the pixel size is 4 μm, and the width is measured in a plane of the pixel surface and in a direction which is orthogonal to a spectral direction of the spectra.

The term "store," "stored," "storing," or any variation thereof may refer to saving data in any computer readable medium.

The term "computer-readable medium" refers to any available medium that can be accessed by a computing device or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. A computing device or may store and/or retrieve data from a computer-readable medium as described herein.

The term "computing device" as used herein includes mobile, portable, and/or handheld devices, including but not limited to laptops, tablets (including medical grade tablets), smartwatches and other wearable devices, mobile telephones, and smartphones. The term "computing device" may also include a computer such as a desktop computer, or server.

Although particular features have been shown and described, it will be understood that they are not intended to limit the claimed invention, and it will be made obvious to those skilled in the art that various changes and modifications may be made without departing from the spirit and scope of the claimed invention. The specification and drawings are accordingly to be regarded in an illustrative rather than restrictive sense. The claimed invention is intended to cover all alternatives, modifications and equivalents.

The invention claimed is:

1. An apparatus for carrying out spectroscopy, in particular Raman spectroscopy, on a sample, the apparatus being configured to obtain a first spectrum beam from an interaction between a first portion of a laser beam and a sample and a second spectrum beam from an interaction between a second portion of the laser beam and a reference sample, the apparatus comprises an optical system which is configured to guide the first spectrum beam and the second spectrum beam to a diffraction element, the diffraction element being configured to split the first spectrum beam into a first spectrum of spatially separated wavelength components associated with the sample and to split the second spectrum beam into a second spectrum of spatially separated wavelength components associated with the reference sample;

the apparatus comprising a detector with an array of pixels for detecting the first and second spectrum;

the apparatus comprising a data acquisition device which is configured:

to carry out at least one measurement using the detector, wherein, simultaneously, first data which is indicative of the first spectrum of spatially separated wavelength components is detected over time by the array of pixels and second data which is indicative of the second spectrum of spatially separated wavelength components is detected over time by the array of pixels, wherein the first data is collected in different pixels than the second data;

the data acquisition device being further configured to carry out the following processes:

a) determining a point spread function PSF from the second data related to a measured spectrum of the reference sample and a predetermined spectrum of the reference sample, wherein the PSF is determined using a convolution function that provides a predetermined relationship between the PSF, a measured spectrum in the second data and an ideal spectrum of the reference sample;

b) determining a real spectrum of the sample using the determined PSF and the first data related to the measured spectrum of the sample.

2. The apparatus of claim 1, wherein the determining of the real spectrum of the sample includes using the determined PSF and the first data related to the measured spectrum of the sample in a deconvolution function, which is the inverse of the convolution function.

3. The apparatus of claim 1, wherein the data acquisition device is configured to detect a predefined event, when the event occurs during the measurement, wherein the data acquisition device is configured to carry out steps a) and b) in response to the detection of the predefined event.

4. The apparatus of claim 3, wherein the predefined event is causing a movement or a change in position of the first spectrum or the second spectrum on the array of pixels during a measurement.

5. The apparatus of claim 3, wherein the predefined event is a mode hop of a laser used to provide the laser beam.

6. The apparatus of claim 1, wherein predefined boundary conditions of the optical system are included in at least one of the following: the convolution function and the deconvolution function.

7. The apparatus of claim 1, wherein, in the data acquisition device a second PSF obtained from a second reference sample, such as diamond or calcite, is provided, and wherein the data acquisition device is configured to determine a deblurred real spectrum of the sample using the second PSF.

8. The apparatus of claim 1, wherein the data acquisition device is configured to carry out a wavelength calibration over time on the first data using the second data that has been simultaneously detected.

9. The apparatus of claim 8, wherein the data acquisition device is configured to identify in the second data at least one peak of the reference spectrum and to employ the identified at least one peak for wavelength calibration of the first data.

10. The apparatus of claim 1, wherein the data acquisition device is configured to measure an intensity over time of at least one of the following:

the first portion of a laser beam, the second portion of the laser beam, a common laser beam from which the first and second portions of the laser beam are generated, an intensity of the first spectrum, an intensity of the second spectrum; and wherein the data acquisition device is configured to employ the measured intensity for normalizing simultaneously measured intensity values which are included in the first data.

11. The apparatus of claim 1, wherein the data acquisition device is configured to calculate an intensity over time of the second spectrum from the second data and to employ the calculated intensity for normalizing simultaneously measured intensity values which are included in the first data.

12. The apparatus of claim 1, wherein the apparatus comprises at least one laser for generating the first and second portions of the laser beam, wherein the laser is split into the first and second portions of the laser beam by use of a beam splitter.

13. The apparatus of claim 12, wherein the laser is at least one of the following: a non-wavelength stabilized laser, a non-temperature stabilized laser, a tunable laser, a diode laser.

14. The apparatus of claim 1, wherein the apparatus comprises an optical system which comprises a slit or a pinhole through which the first and second spectrum beams are guide before they pass through the diffraction element, wherein a width of the slit or a diameter of the pinhole is larger than an optimal value for the width of diameter, wherein the optimal value is associated with the pixel limited spectral resolution of the array of pixels.

15. The apparatus of claim 14, wherein the width of the slit or the diameter of the pinhole corresponds to or is larger than 1.2 or 1.3 or 1.4, or 1.5 time the optimal value.

16. The apparatus of claim 14, wherein the reference sample is arranged on one side of an element that forms the slit or pinhole.

17. The apparatus of claim 14, wherein each of the first and second spectrum beam is focused to a focal point when passing through the slit or pinhole, wherein the focal point of the first spectrum beam is shifted from the focal point of the second spectrum beam.

18. The apparatus of claim 1, wherein the apparatus comprises an optical system configured to compress a width of the first spectrum and a width of the second spectrum at the location of the detector to a value which is in the range of the size of a pixel and optionally lower than the pixel size, wherein the width is measured in a plane of the pixel surface and in a direction which is orthogonal to a spectral direction of the spectra.

19. A computer implemented method for carrying out spectroscopy, in particular Raman spectroscopy, on a sample, wherein the method uses an apparatus which is configured to obtain a first spectrum beam from an interaction between a first portion of a laser beam and a sample and to obtain a second spectrum beam from an interaction between a second portion of the laser beam and a reference sample, wherein the apparatus comprises an optical system which is configured to guide the first spectrum beam and the second spectrum beam to a diffraction element, and the diffraction element is configured to split the first spectrum beam into a first spectrum of spatially separated wavelength components associated with the sample and to split the second spectrum beam into a second spectrum of spatially separated wavelength components associated with the reference sample, wherein the apparatus further comprises a detector with an array of pixels for detecting the first and second spectrum, and wherein the method comprises:

detecting, simultaneously and as a function of time, first data which is indicative of the first spectrum of spatially separated wavelength components on the array of pixels and second data which is indicative of the second spectrum of spatially separated wavelength components on the array of pixels, wherein the first data is collected in different pixels than the second data, determining a point spread function PSF from the second data related to a measured spectrum of the reference sample and a predetermined spectrum of the reference sample, wherein the PSF function is determined using a convolution function that provides a predetermined relationship between the PSF, a measured spectrum and a spectrum in the second data and an ideal spectrum of the reference sample;

determining a real spectrum of the sample using the determined PSF and the first data related to the measured spectrum of the sample.

20. The computer implemented method of claim 19, wherein determining the real spectrum of the sample comprises using the determined PSF and the first data related to the measured spectrum of the sample in a deconvolution function, which is the inverse of the convolution function.

* * * * *